UNITED STATES PATENT OFFICE.

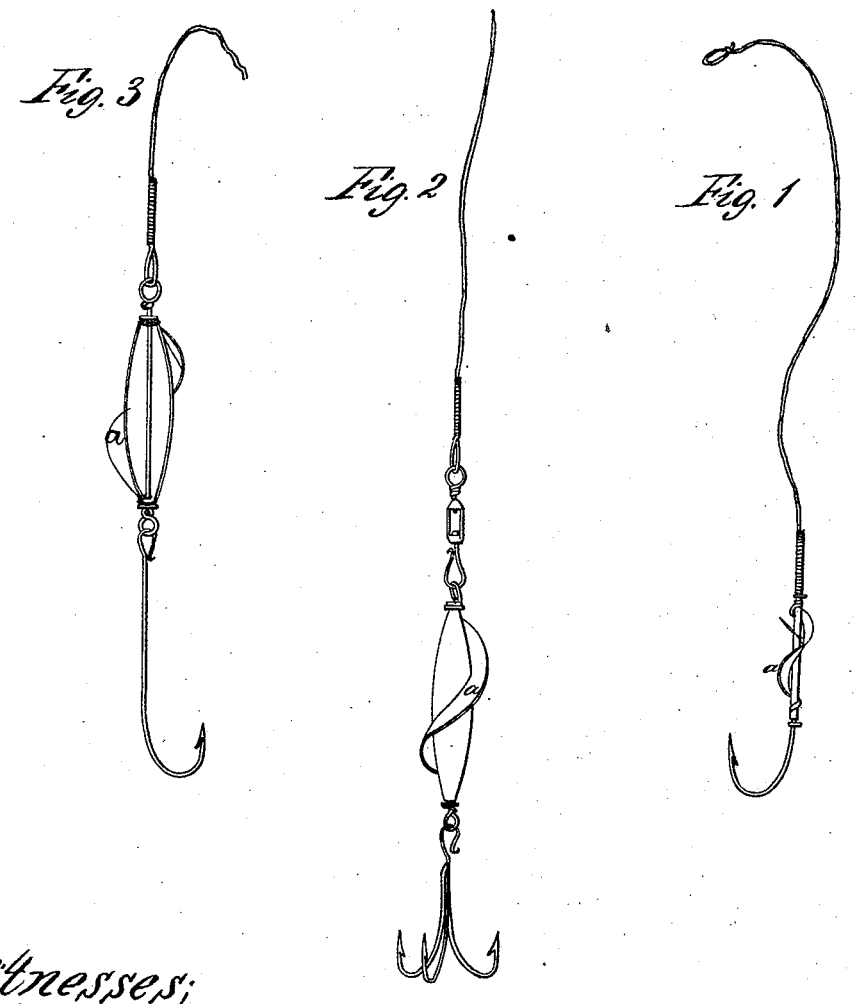

CHARLES DE SAXE, OF NEW YORK, N. Y., ASSIGNOR TO THOMAS H. BATE.

IMPROVED SERPENTINE SPINNER TO CATCH FISH.

Specification forming part of Letters Patent No. 13,068, dated June 12, 1855.

*To all whom it may concern:*

Be it known that I, CHARLES DE SAXE, of the city and State of New York, have invented certain new and useful Improvements in Fishing-Tackle and designated as a "Serpentine Spinner;" and I do hereby declare that the following is a full and exact description thereof, reference being had to the accompanying drawings, and to the letters of reference marked thereon.

The nature and design and effect of my improvement are to give continual motion to any hook or tackle to which it may be attached, even in water where there is but a very little current or motion, and thus more effectually entice the fish angled for.

My invention consists in coiling or winding a piece of brass or other metal, $a$, upon its edge, this coiled piece of metal tapering at each end, as shown in the drawings, and in attaching the same by its edge to a hook, Figure 1, or to a hollow tube connected with a hook, Fig. 2, or to a piece of tackle, shown at Fig. 3, or to any contrivance used in angling, and to which the hook is attached.

The particular tackle to which the serpentine spinner is attached is not material, but it should be attached in the general manner shown in the figures.

As will be apparent from examining the construction of the serpentine spinner and the manner of attaching it to a hook, &c., the slightest motion or current of the water acts upon the flat surface or side of the spinner and gives motion to it, and in such a manner as constantly to subject a new part of the coil to the like action of the water, and its rotating motion is therefore continually preserved, and in proportion to its size it also offers a large surface to the action of the water.

The spinner may be made of any size desired, and proportionate to the hook or other tackle to which it is to be attached and with which it is to be used; and it may also be placed inside of a tube, as well as about any tackle, as before described. It may also be attached to decoy-fish, and in every case it insures the easiest and most constant motion, as from its very construction its natural position, when in the water, is that of a rotary motion. The ease and facility with which it receives and keeps such a motion may be seen by blowing with the breath lengthwise of the spinner, which causes it to rotate very rapidly.

I am aware that there has been heretofore a piece of tackle designed for the same general purpose made of a flat strip of metal of equal width and having at the lower end flukes or fins, and the whole twisted in an auger-like shape; but the construction, as above, of my improved serpentine spinner is new, and is believed to be, and is so considered by those familiar with its operation, the best contrivance known for giving motion to the hook.

I am also aware that a spinner has been constructed attached to each side of a piece of tackle similar to that shown in Fig. 1, made of flat pieces of metal, and having the ends of such pieces turned, one up and the other down, to form flukes or propellers; but

What I claim as my invention, and desire to secure by Letters Patent, is—

A spinner, substantially as above described, constructed of a piece of metal, $a$, twisted or coiled upon its edge and then attached to and winding about a hook or other piece of tackle, for the purposes above set forth.

CHARLES DE SAXE.

Witnesses:
S. D. LAW,
GEORGE BRAINERD.